US009215197B2

(12) United States Patent
Basavapatna et al.

(10) Patent No.: US 9,215,197 B2
(45) Date of Patent: **\*Dec. 15, 2015**

(54) SYSTEM, METHOD, AND COMPUTER PROGRAM PRODUCT FOR PREVENTING IMAGE-RELATED DATA LOSS

(75) Inventors: Prasanna Ganapathi Basavapatna, Bangalore (IN); Gopi Krishna Chebiyyam, Hyderabad (IN)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/429,363

(22) Filed: Mar. 24, 2012

(65) Prior Publication Data

US 2012/0183174 A1    Jul. 19, 2012

Related U.S. Application Data

(63) Continuation of application No. 11/840,831, filed on Aug. 17, 2007.

(51) Int. Cl.
| | | |
|---|---|---|
| *G06K 9/00* | (2006.01) | |
| *H04L 12/58* | (2006.01) | |
| *G06F 21/55* | (2013.01) | |
| *G06F 21/62* | (2013.01) | |

(52) U.S. Cl.
CPC .............. *H04L 51/12* (2013.01); *G06F 21/554* (2013.01); *G06F 21/6209* (2013.01); *H04L 51/08* (2013.01); *G06F 2221/2101* (2013.01); *G06K 2209/01* (2013.01)

(58) Field of Classification Search
None
See application file for complete search history.

(56) References Cited

U.S. PATENT DOCUMENTS

| | | |
|---|---|---|
| 4,797,447 A | 1/1989 | Gergen et al. |
| 5,195,086 A | 3/1993 | Baumgartner et al. |
| 5,280,527 A | 1/1994 | Gullman et al. |
| 5,485,068 A | 1/1996 | Vaught |
| 5,572,694 A | 11/1996 | Uchino |
| 5,796,948 A | 8/1998 | Cohen |
| 5,845,068 A | 12/1998 | Winiger |
| 5,941,915 A | 8/1999 | Federle et al. |
| 5,987,610 A | 11/1999 | Franczek et al. |
| 6,073,142 A | 6/2000 | Geiger et al. |
| 6,081,265 A | 6/2000 | Nakayama et al. |
| 6,177,932 B1 | 1/2001 | Galdes et al. |
| 6,240,417 B1 | 5/2001 | Eastwick et al. |
| 6,367,019 B1 | 4/2002 | Ansell et al. |
| 6,460,050 B1 | 10/2002 | Pace et al. |
| 6,658,566 B1 | 12/2003 | Hazard |

(Continued)

FOREIGN PATENT DOCUMENTS

| | | |
|---|---|---|
| GB | 2411330 | 8/2005 |
| WO | WO 02093410 | 11/2002 |
| WO | WO 2006/076536 | 7/2006 |

OTHER PUBLICATIONS

U.S. Appl. No. 11/349,479, filed on Feb. 6, 2006.

(Continued)

*Primary Examiner* — Nancy Bitar
(74) *Attorney, Agent, or Firm* — Patent Capital Group (57) ABSTRACT

A system, method, and computer program product are provided for preventing data loss associated with an image. In use, an image is identified, and it is determined whether the image includes predetermined data. In addition, an action is performed based on the determination, for preventing data loss.

20 Claims, 6 Drawing Sheets

(56) References Cited

U.S. PATENT DOCUMENTS

| | | | |
|---|---|---|---|
| 6,718,367 B1 | 4/2004 | Ayyadurai | |
| 6,741,851 B1 | 5/2004 | Lee et al. | |
| 6,820,204 B1 | 11/2004 | Desai et al. | |
| 6,934,857 B1 | 8/2005 | Bartleson et al. | |
| 6,957,330 B1 | 10/2005 | Hughes | |
| 6,961,765 B2 | 11/2005 | Terry | |
| 7,023,816 B2 | 4/2006 | Couillard | |
| 7,100,123 B1 | 8/2006 | Todd et al. | |
| 7,124,197 B2 | 10/2006 | Ocepek et al. | |
| 7,149,778 B1 | 12/2006 | Patel et al. | |
| 7,194,623 B1 | 3/2007 | Proudler et al. | |
| 7,194,728 B1 | 3/2007 | Sirota et al. | |
| 7,222,305 B2 | 5/2007 | Teplov et al. | |
| 7,257,707 B2 | 8/2007 | England et al. | |
| 7,278,016 B1 | 10/2007 | Detrick et al. | |
| 7,313,615 B2 | 12/2007 | Fitzpatrick et al. | |
| 7,346,778 B1 | 3/2008 | Guiter et al. | |
| 7,350,074 B2 | 3/2008 | Gupta et al. | |
| 7,350,084 B2 | 3/2008 | Abiko et al. | |
| 7,383,433 B2 | 6/2008 | Yeager et al. | |
| 7,424,543 B2 | 9/2008 | Rice et al. | |
| 7,434,513 B2 | 10/2008 | Dannoux | |
| 7,437,752 B2* | 10/2008 | Heard et al. | 726/1 |
| 7,441,000 B2 | 10/2008 | Boehringer et al. | |
| 7,461,249 B1 | 12/2008 | Pearson et al. | |
| 7,475,420 B1 | 1/2009 | Hernacki | |
| 7,484,247 B2 | 1/2009 | Rozman et al. | |
| 7,490,355 B2 | 2/2009 | Wong | |
| 7,497,447 B2 | 3/2009 | Musselman | |
| 7,506,155 B1 | 3/2009 | Stewart et al. | |
| 7,519,984 B2 | 4/2009 | Bhogal et al. | |
| 7,523,484 B2 | 4/2009 | Lum et al. | |
| 7,526,654 B2 | 4/2009 | Charbonneau | |
| 7,539,857 B2 | 5/2009 | Bartlett et al. | |
| 7,559,080 B2 | 7/2009 | Bhargavan et al. | |
| 7,581,004 B2 | 8/2009 | Jakobson | |
| 7,630,986 B1 | 12/2009 | Herz et al. | |
| 7,653,811 B2 | 1/2010 | Yagiura | |
| 7,660,845 B2 | 2/2010 | Fusari | |
| 7,661,124 B2 | 2/2010 | Ramanathan et al. | |
| 7,689,563 B1* | 3/2010 | Jacobson | 707/663 |
| 7,725,934 B2* | 5/2010 | Kumar et al. | 726/22 |
| 7,730,040 B2 | 6/2010 | Reasor et al. | |
| 7,742,406 B1 | 6/2010 | Muppala | |
| 7,847,694 B2* | 12/2010 | Lee et al. | 340/572.1 |
| 7,877,616 B2 | 1/2011 | Abiko et al. | |
| 7,890,587 B1 | 2/2011 | Chebiyyam | |
| 7,940,756 B1* | 5/2011 | Duffy et al. | 370/389 |
| 8,103,727 B2 | 1/2012 | Lin | |
| 8,111,413 B2 | 2/2012 | Nuggehalli et al. | |
| 8,151,363 B2 | 4/2012 | Smithson | |
| 8,181,036 B1 | 5/2012 | Nachenberg | |
| 8,199,965 B1 | 6/2012 | Basavapatna et al. | |
| 8,272,058 B2 | 9/2012 | Brennan | |
| 8,353,053 B1 | 1/2013 | Chebiyyam | |
| 8,446,607 B2 | 5/2013 | Zucker et al. | |
| 8,590,002 B1 | 11/2013 | Chebiyyam | |
| 8,621,008 B2 | 12/2013 | Chebiyyam | |
| 8,713,468 B2 | 4/2014 | Chebiyyam | |
| 8,893,285 B2* | 11/2014 | Zucker et al. | 726/26 |
| 2001/0046069 A1 | 11/2001 | Jones | |
| 2002/0046275 A1 | 4/2002 | Crosbie et al. | |
| 2002/0046575 A1 | 4/2002 | Hayes et al. | |
| 2002/0083003 A1 | 6/2002 | Halliday et al. | |
| 2002/0099944 A1 | 7/2002 | Bowlin | |
| 2002/0157089 A1 | 10/2002 | Patel et al. | |
| 2003/0043036 A1 | 3/2003 | Merrem et al. | |
| 2003/0043039 A1 | 3/2003 | Salemi et al. | |
| 2003/0046679 A1 | 3/2003 | Singleton | |
| 2003/0065937 A1 | 4/2003 | Watanabe et al. | |
| 2003/0097583 A1 | 5/2003 | Lacan et al. | |
| 2003/0105979 A1 | 6/2003 | Itoh et al. | |
| 2003/0133443 A1 | 7/2003 | Klinker et al. | |
| 2003/0135744 A1 | 7/2003 | Almeida | |
| 2003/0177394 A1 | 9/2003 | Dozortsev | |
| 2003/0182435 A1 | 9/2003 | Redlich et al. | |
| 2003/0192033 A1 | 10/2003 | Gartside et al. | |
| 2003/0233421 A1 | 12/2003 | Shibata et al. | |
| 2004/0003255 A1 | 1/2004 | Apvrille et al. | |
| 2004/0006715 A1 | 1/2004 | Skrepetos | |
| 2004/0010686 A1 | 1/2004 | Goh et al. | |
| 2004/0027601 A1 | 2/2004 | Ito et al. | |
| 2004/0034794 A1 | 2/2004 | Mayer et al. | |
| 2004/0054928 A1 | 3/2004 | Hall | |
| 2004/0064732 A1 | 4/2004 | Hall | |
| 2004/0088433 A1 | 5/2004 | Kaler et al. | |
| 2004/0111482 A1 | 6/2004 | Bourges-Waldegg et al. | |
| 2004/0117802 A1 | 6/2004 | Green | |
| 2004/0146006 A1 | 7/2004 | Jackson | |
| 2004/0172557 A1 | 9/2004 | Nakae et al. | |
| 2004/0199555 A1 | 10/2004 | Krachman | |
| 2004/0199566 A1 | 10/2004 | Carlson et al. | |
| 2004/0199596 A1 | 10/2004 | Nutkis | |
| 2004/0230572 A1 | 11/2004 | Omigui | |
| 2004/0255138 A1 | 12/2004 | Nakae | |
| 2005/0004359 A1 | 1/2005 | Rai et al. | |
| 2005/0033810 A1 | 2/2005 | Malcolm | |
| 2005/0038853 A1 | 2/2005 | Blanc et al. | |
| 2005/0044359 A1 | 2/2005 | Eriksson et al. | |
| 2005/0058285 A1 | 3/2005 | Stein et al. | |
| 2005/0060643 A1 | 3/2005 | Glass et al. | |
| 2005/0116749 A1 | 6/2005 | Pentakota et al. | |
| 2005/0131990 A1 | 6/2005 | Jewell | |
| 2005/0132184 A1 | 6/2005 | Palliyil et al. | |
| 2005/0154885 A1 | 7/2005 | Viscomi et al. | |
| 2005/0166066 A1* | 7/2005 | Ahuja et al. | 713/189 |
| 2005/0172140 A1 | 8/2005 | Ide | |
| 2005/0198285 A1 | 9/2005 | Petit | |
| 2005/0204009 A1* | 9/2005 | Hazarika et al. | 709/206 |
| 2005/0216749 A1 | 9/2005 | Brent | |
| 2005/0262208 A1 | 11/2005 | Haviv et al. | |
| 2005/0272861 A1 | 12/2005 | Qiao et al. | |
| 2005/0275861 A1 | 12/2005 | Ferlitsch | |
| 2005/0289181 A1 | 12/2005 | Deninger et al. | |
| 2006/0005244 A1 | 1/2006 | Garbow et al. | |
| 2006/0010150 A1 | 1/2006 | Shaath et al. | |
| 2006/0010209 A1* | 1/2006 | Hodgson | 709/206 |
| 2006/0010217 A1 | 1/2006 | Sood | |
| 2006/0021043 A1 | 1/2006 | Kaneko et al. | |
| 2006/0026593 A1 | 2/2006 | Canning et al. | |
| 2006/0031359 A1 | 2/2006 | Clegg et al. | |
| 2006/0039554 A1 | 2/2006 | Fry | |
| 2006/0041930 A1 | 2/2006 | Hafeman et al. | |
| 2006/0050879 A1 | 3/2006 | Iizuka | |
| 2006/0059548 A1 | 3/2006 | Hildre et al. | |
| 2006/0070089 A1 | 3/2006 | Shoaib et al. | |
| 2006/0075040 A1 | 4/2006 | Chmaytelli | |
| 2006/0075502 A1 | 4/2006 | Edwards | |
| 2006/0112166 A1 | 5/2006 | Pettigrew et al. | |
| 2006/0120526 A1 | 6/2006 | Boucher et al. | |
| 2006/0123413 A1 | 6/2006 | Collet et al. | |
| 2006/0123479 A1* | 6/2006 | Kumar et al. | 726/23 |
| 2006/0132824 A1 | 6/2006 | Aritomi | |
| 2006/0168026 A1 | 7/2006 | Keohane et al. | |
| 2006/0190986 A1 | 8/2006 | Mont | |
| 2006/0224589 A1* | 10/2006 | Rowney et al. | 707/9 |
| 2006/0248252 A1 | 11/2006 | Kharwa | |
| 2007/0022285 A1 | 1/2007 | Groth et al. | |
| 2007/0028112 A1 | 2/2007 | Mackelden et al. | |
| 2007/0029744 A1 | 2/2007 | Musselman | |
| 2007/0033283 A1* | 2/2007 | Brown | 709/226 |
| 2007/0064883 A1 | 3/2007 | Rosenthal et al. | |
| 2007/0074292 A1 | 3/2007 | Mimatsu | |
| 2007/0094394 A1 | 4/2007 | Singh et al. | |
| 2007/0101419 A1 | 5/2007 | Dawson | |
| 2007/0110089 A1 | 5/2007 | Essafi et al. | |
| 2007/0118904 A1 | 5/2007 | Goodman et al. | |
| 2007/0136593 A1 | 6/2007 | Plavcan et al. | |
| 2007/0143472 A1 | 6/2007 | Clark et al. | |
| 2007/0143851 A1 | 6/2007 | Nicodemus et al. | |
| 2007/0174909 A1 | 7/2007 | Burchett et al. | |
| 2007/0198656 A1 | 8/2007 | Mazzaferri et al. | |
| 2007/0214220 A1 | 9/2007 | Alsop et al. | |
| 2007/0220319 A1 | 9/2007 | Desai et al. | |

(56) References Cited

U.S. PATENT DOCUMENTS

| | | | |
|---|---|---|---|
| 2007/0245148 A1 | 10/2007 | Buer | |
| 2007/0256142 A1 | 11/2007 | Hartung et al. | |
| 2007/0279668 A1 | 12/2007 | Czyszczewski et al. | |
| 2007/0280112 A1* | 12/2007 | Zheng et al. | 370/235 |
| 2008/0034224 A1 | 2/2008 | Ferren et al. | |
| 2008/0040358 A1* | 2/2008 | Deng | 707/100 |
| 2008/0065882 A1 | 3/2008 | Goodman et al. | |
| 2008/0065903 A1 | 3/2008 | Goodman et al. | |
| 2008/0079730 A1 | 4/2008 | Zhang et al. | |
| 2008/0083037 A1 | 4/2008 | Kruse et al. | |
| 2008/0120689 A1 | 5/2008 | Morris et al. | |
| 2008/0170785 A1 | 7/2008 | Simmons et al. | |
| 2008/0208988 A1 | 8/2008 | Khouri et al. | |
| 2008/0229428 A1 | 9/2008 | Camiel | |
| 2008/0262991 A1* | 10/2008 | Kapoor et al. | 706/20 |
| 2008/0279381 A1 | 11/2008 | Narendra et al. | |
| 2008/0309967 A1 | 12/2008 | Ferlitsch et al. | |
| 2009/0055536 A1 | 2/2009 | Jo | |
| 2009/0086252 A1 | 4/2009 | Zucker et al. | |
| 2009/0172786 A1* | 7/2009 | Backa | 726/4 |
| 2009/0182931 A1 | 7/2009 | Gill et al. | |
| 2009/0232300 A1 | 9/2009 | Zucker et al. | |
| 2009/0327743 A1* | 12/2009 | Finlayson et al. | 713/186 |
| 2010/0174784 A1 | 7/2010 | Levey et al. | |
| 2010/0250547 A1* | 9/2010 | Grefenstette et al. | 707/740 |
| 2011/0167265 A1 | 7/2011 | Ahuja et al. | |
| 2011/0273584 A1 | 11/2011 | Ogawa | |
| 2012/0011189 A1 | 1/2012 | Werner et al. | |
| 2012/0191792 A1 | 7/2012 | Chebiyyam | |
| 2013/0246534 A1 | 9/2013 | Chebiyyam | |
| 2013/0276061 A1 | 10/2013 | Chebiyyam et al. | |
| 2014/0115086 A1 | 4/2014 | Chebiyyam | |
| 2014/0283145 A1 | 9/2014 | Chebiyyam et al. | |

OTHER PUBLICATIONS

Non-Final Rejection in U.S. Appl. No. 11/349,479 mailed on Dec. 8, 2008.
Final Rejection in U.S. Appl. No. 11/349,479 mailed on Jun. 10, 2009.
Notice of Appeal in U.S. Appl. No. 11/349,479, filed on Dec. 12, 2009.
Examiner Interview Summary in U.S. Appl. No. 11/349,479 mailed on Feb. 5, 2010.
Non-Final Rejection in U.S. Appl. No. 11/349,479 mailed on Mar. 22, 2010.
Notice of Allowance in U.S. Appl. No. 11/349,479 mailed on Nov. 8, 2010.
U.S. Appl. No. 11/473,930, filed on Jun. 23, 2006.
Non-Final Office Action in U.S. Appl. No. 11/473,930 mailed on Aug. 17, 2009.
Non-Final Office Action in U.S. Appl. No. 11/473,930 mailed on Jan. 26, 2010.
Non-Final Office Action in U.S. Appl. No. 11/473,930 mailed on Jul. 16, 2010.
Non-Final Office Action in U.S. Appl. No. 11/473,930 mailed on Mar. 10, 2011.
Final Office Action in U.S. Appl. No. 11/473,930 mailed on Sep. 14, 2011.
Non-Final Office Action in U.S. Appl. No. 11/473,930 mailed on Mar. 1, 2012.
Final Office Action in U.S. Appl. No. 11/473,930 mailed on Aug. 8, 2012.
Non-Final Office Action in U.S. Appl. No. 11/473,930 mailed Feb. 4, 2013.
Final Office Action in U.S. Appl. No. 11/473,930 mailed on Jul. 16, 2013.
U.S. Appl. No. 11/546,745, filed on Nov. 29, 2006.
Non-Final Office Action in U.S. Appl. No. 11/546,745 mailed on Nov. 2, 2009.
Non-Final Office Action in U.S. Appl. No. 11/546,745 mailed on Apr. 21, 2010.
Final Office Action in U.S. Appl. No. 11/546,745 mailed on Oct. 21, 2010.
Non-Final Office Action in U.S. Appl. No. 11/564,745 mailed on Jan. 19, 2012.
Final Office Action in U.S. Appl. No. 11/564,745 mailed Jun. 4, 2012.
Non-Final Office Action in U.S. Appl. No. 11/564,745 mailed on Apr. 5, 2013.
Notice of Allowance in U.S. Appl. No. 11/564,745 mailed on Jul. 29, 2013.
U.S. Appl. No. 11/740,884, filed on Apr. 26, 2007.
Non-Final Office Action in U.S. Appl. No. 11/740,884 mailed on May 14, 2009.
Final Office Action in U.S. Appl. No. 11/740,844 mailed on Jan. 11, 2010.
Advisory Action in U.S. Appl. No. 11/740,844 mailed on Mar. 25, 2010.
Non-Final Office Action in U.S. Appl. No. 11/740,844 mailed on Jun. 24, 2010.
Final Office Action in U.S. Appl. No. 11/740,844 mailed on Feb. 18, 2011.
Advisory Action in U.S. Appl. No. 11/740,844 mailed on Apr. 27, 2011.
Non-Final Office Action in U.S. Appl. No. 11/740,844 mailed on Jul. 20, 2011.
Final Office Action in U.S. Appl. No. 11/740,844 mailed on Feb. 16, 2012.
Non-Final Office Action in U.S. Appl. No. 11/740,844 mailed on May 10, 2012.
Final Office Action in U.S. Appl. No. 11/740,844 mailed on Aug. 15, 2012.
Non-Final Office Action in U.S. Appl. No. 11/740,844 mailed on May 3, 2013.
Notice of Allowance in U.S. Appl. No. 11/740,844 mailed on Sep. 5, 2013.
U.S. Appl. No. 11/840,831, filed on Aug. 17, 2007.
Non-Final Office Action in U.S. Appl. No. 11/840,831 mailed on Oct. 12, 2010.
Final Office Action in U.S. Appl. No. 11/840,831 mailed on May 5, 2011.
Non-Final Office Action in U.S. Appl. No. 11/840,831 mailed on Jul. 21, 2011.
Final Office Action in U.S. Appl. No. 11/840,831 mailed on Dec. 21, 2011.
Notice of Allowance in U.S. Appl. No. 11/840,831 mailed on Mar. 16, 2012.
Notice of Allowance in U.S. Appl. No. 11/840,831 mailed on Apr. 3, 2012.
Notice of Allowance in U.S. Appl. No. 11/840,831 mailed on May 9, 2012.
Non-Final Office Action in U.S. Appl. No. 11/905,420 mailed on May 23, 2011.
Final Office Action in U.S. Appl. No. 11/905,420 mailed on Nov. 2, 2011.
Non-Final Office Action in U.S. Appl. No. 11/905,420 mailed on Jul. 23, 2011.
Notice of Allowance in U.S. Appl. No. 11/905,420 mailed on Dec. 6, 2012.
Non-Final Office Action in U.S. Appl. No. 12/076,163 mailed on Apr. 28, 2011.
Final Office Action in U.S. Appl. No. 12/076,163 mailed on Oct. 19, 2011.
Non-Final Office Action in U.S. Appl. No. 12/076,163 mailed on Sep. 4, 2012.
Final Office Action in U.S. Appl. No. 12/076,163 mailed on Mar. 25, 2013.
Non-Final Office Action in U.S. Appl. No. 12/076,163 mailed on Sep. 10, 2013.
Non-Final Office Action in U.S. Appl. No. 12/187,207 mailed on Mar. 25, 2011.
Notice of Allowance in U.S. Appl. No. 12/187,207 mailed on Aug. 24, 2011.
Notice of Allowance in U.S. Appl. No. 12/187,207 mailed on Sep. 11, 2012.

(56) References Cited

OTHER PUBLICATIONS

U.S. Appl. No. 13/434,777, filed on Mar. 29, 2012, entitled "System, Method, and Computer Program Product for Determing Whether an Electronic Mail Messgae is Compliant with Etiquette Policy", Inventor Gopi Krishna Chebiyyam.
Non-Final Office Action in U.S. Appl. No. 13/434,777 mailed on Aug. 20, 2012.
Final Office Action in U.S. Appl. No. 13/434,777 mailed on Feb. 12, 2013.
Non-Final Office Action in U.S. Appl. No. 13/343,777 mailed on May 23, 2013.
Notice of Allowance mailed in U.S. Appl. No. 13/434,777 mailed Dec. 17, 2013.
U.S. Appl. No. 11/850,432, filed on Sep. 5, 2007.
U.S. Appl. No. 12/123,370, filed on May 19, 2008.
U.S. Appl. No. 12/102,526, filed Apr. 14, 2008, entitled Computer Program Product and Method for Permanently Storing Data Based on Whether a Device is Protected with an Encryption Mechanism and Whether Data is a Data Structer Requires Encryption, inventor Gopi Krishna Chebiyyam.
Non-Final Office Action in U.S. Appl. No. 12/102,526 mailed on Nov. 24, 2010.
Final Office Action in U.S. Appl. No. 12/102,526 mailed on May 25, 2011.
Advisory Action in U.S. Appl. No. 12/102,526 mailed on Aug. 1, 2011.
Notice of Allowance in U.S. Appl. No. 12/102,526 mailed on Sep. 21, 2013.
U.S Appl. No. 11/210,321, filed on Aug. 23, 2005.
Fumera, G. et al., "Spam Filtering Based on the Analysis of Text Information Embedded into Images," Journal of Machine Learning Research, Dec. 2006, 22 pages.
Layland, Robin, "Data Leak Prevention: Coming Soon to a Business Near You," Business Communications Review, May 2007 (pp. 44-49).
Heikkila, Faith M., "Encryption: Security Considerations for Portable Media Devices," IEEE Computer Society, IEEE Security & Provacy, Jul./Aug. 2007 (pp. 22-27).
ClearContext, www.clearcontext.com/user_guide/; [avaliable online at URL <http://web.archive.org/20061107135010/http://www.clearcontext.com/user_guide/>], Nov. 7, 2006 (pp. 1-24).
Dabbish, et al., "Understanding Email Use: Predicting Action on a Message," CHI 2005—Papers: Email and Security, Portland Oregon; available online at URL: <http://www.cs.cmu.edu/~kraut/Rkraut.site.files/articles/dabbish05-UnderstandingEmailUse.pdf>] Apr. 2-7, 2005 (pp. 691-700).
U.S. Appl. No. 14/144,136, filed on Dec. 30, 2013, 27 pages.
Non-Final Office Action in U.S. Appl. No. 14/144,136 mailed Jun. 2, 2014, 39 pages.
Non-Final Office Action for U.S. Appl. No. 13/429,363 mailed on Sep. 23, 2013, 22 pages.
Final Office Action for U.S. Appl. No. 13/429,363 mailed Mar. 21, 2014, 27 pages.
Final Office Action in U.S. Appl. No. 12/076,163 mailed Mar. 18, 2014, 76 pages.
Notice of Allowance in U.S. Appl. No. 12/076,163 mailed Jul. 18, 2014, 27 pages.
Masaru Takesue, "A Scheme for Protecting the Information Leakage via Portable Devices", International Confererence on Emerging Security Information, System and Technologies, 0-7695-2989-5/07 © 2007 IEEE, pp. 54-59.
Hangbae Chang et al., "Design of Inside Information Leakage Prevention System in Ubiquitous Computing Environment", O. Gervasi et al. (Eds.): ICCSA 2005, LNCS 3483, pp, 128-137, 2005 © Springer-Verlag Berlin Heidelberg 2005.
Faith M. Heikkila, "Encryption: Security Considerations for Portable Media Devices", Cryptography, IEEE Computer Society, 1540-7993/07 © 2007 IEEE, pp. 22-27.
Robin Layland, "Data Leak Prevention: Coming Soon to a Business Near You", Business Communications Review, May 2007, pp. 44-49.
Mingdi Xu et al., "A New Data Protecting Scheme Based on TPM", 8th ACIS International Conference on Software Engineering, Artificial Intelligence, Networking, and Parallel/Distributed Computing, 0-7695-2909-7/07 © 2007 IEEE, pp. 943-947.
Peter Hannay et al., "Pocket SDV with SD Guardian: A Secure & Forensically Safe Portable Execution Environment", Edith Cowan University, Australian Digital Forensics Conference, Security Research Institute Conferences, Dec. 3, 2007, http://ro.edu.edu.au/adf/17, 11 pages.
Morejon, Mario, "Review: Remote Desktop Support Out of the Box", CRN, May 21, 2007, 2 pages.
Non-Final Office Action received for U.S. Appl. No. 11/850,432 mailed on Oct. 7, 2010. 13 pages.
Final Office Action received in U.S. Appl. No. 11/850,432 mailed May 10, 2011, 14 pages.
Non-Final Office Action received fur U.S. Appl. No. 11/850,432 mailed on Jul. 16, 2013. 17 pages.
Final Office Action received for U.S. Appl. No. 11/850,432 mailed on Jan. 31, 2014. 19 pages.
Non-Final Office Action received for U.S. Appl. No. 12/102,625 mailed on Feb. 6, 2012, 16 pages.
Final Office Action received for U.S. Appl. No. 11/850,432 mailed on May 10, 2011, 14 pages.
Notice of Allowance in U.S. Appl. No. 14/144,136 mailed Sep. 17, 2014, 12 pages.
Non-Final Office Action in U.S. Appl. No. 12/187,207 mailed on Sep. 17, 2014, 16 pages.
Notice of Allowance in U.S. Appl. No. 12/102,526 mailed on Sep. 12, 2012, 13 pages.
U.S. Appl. No. 14/543,869, filed Nov. 17, 2014, 37 pages.

* cited by examiner

SYSTEM, METHOD, AND COMPUTER PROGRAM PRODUCT FOR PREVENTING IMAGE-RELATED DATA LOSS

CROSS-REFERENCE TO RELATED APPLICATION

This application is a continuation (and claims the benefit of priority under 35 U.S.C. §120) of U.S. application Ser. No. 11/840,831, filed Aug. 17, 2007, and entitled "SYSTEM, METHOD, AND COMPUTER PROGRAM PRODUCT FOR PREVENTING IMAGE-RELATED DATA LOSS". The disclosure of the prior application is considered part of and is hereby incorporated by reference in its entirety in the disclosure of this application.

FIELD OF THE INVENTION

The present invention relates to data loss prevention, and more particularly to systems for preventing data loss.

BACKGROUND

Typically, data loss prevention systems are utilized for identifying and analyzing textual-based data in order to ensure that predetermined data is not leaked. However, such data loss prevention systems have traditionally been ineffective with respect to data loss stemming from images. For example, a screenshot which includes confidential data is generally not recognized by a data loss prevention system which only identifies and analyzes text-based data. Thus, conventional data loss prevention systems have typically been unable to prevent data loss caused by the transfer of images containing confidential data. Additionally, these images have not only included screenshots and/or screen captures, but have also included various other types of images.

In some cases, data loss prevention systems have attempted to prevent data loss from images, however, such systems have also exhibited various limitations. For example, such systems have merely attempted to prevent image creation (e.g. by disabling predefined user input commands which are used to create images, etc.). Nevertheless, numerous techniques exist to circumvent these precautionary measures. For example, browser and software resources may be utilized which allow images (e.g. screenshots, etc.) to be created without utilizing such predefined user input commands.

There is thus a need for addressing these and/or other issues associated with the prior art.

SUMMARY

A system, method, and computer program product are provided for preventing data loss associated with an image. In use, an image is identified, and it is determined whether the image includes predetermined data. In addition, an action is performed based on the determination, for preventing data loss.

DETAILED DESCRIPTION

Figure 1:
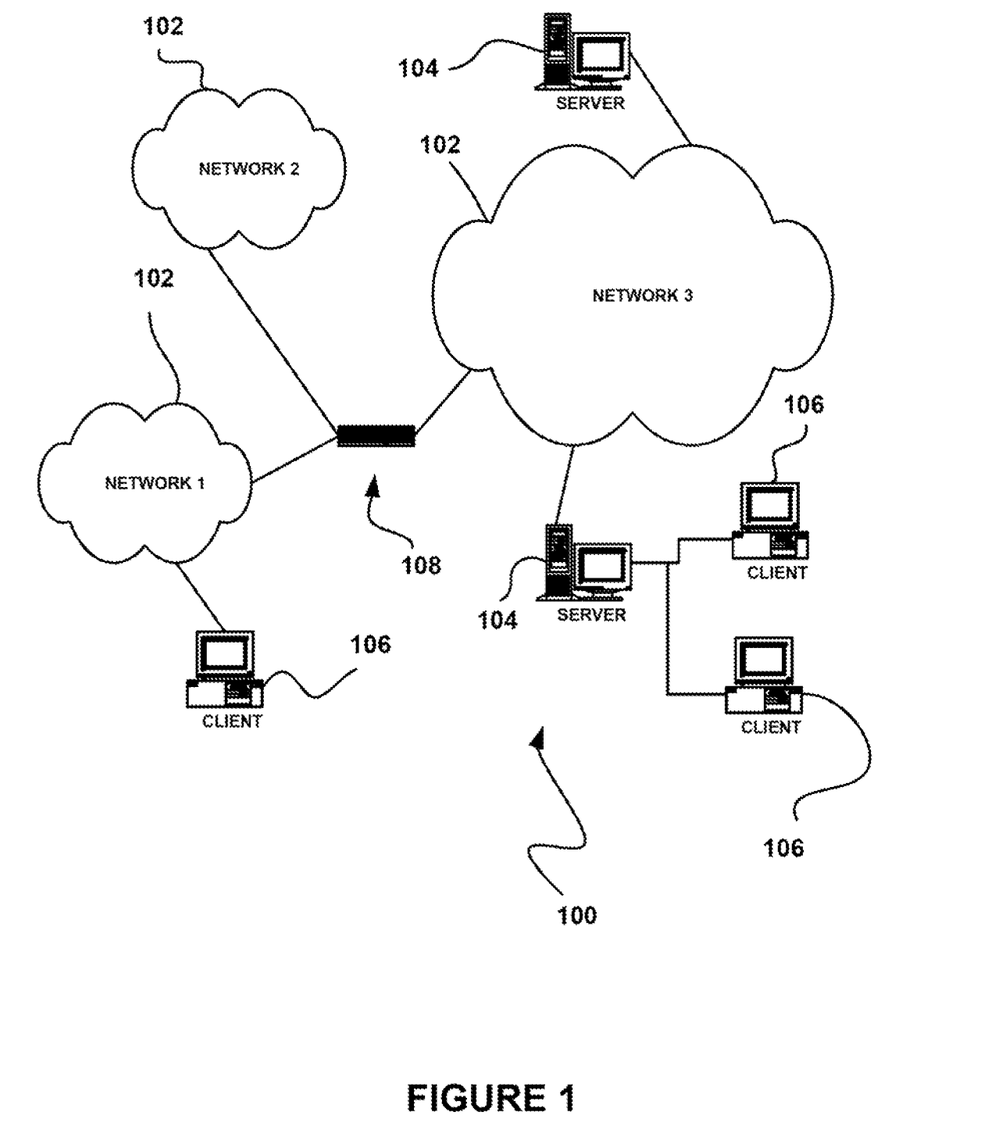
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
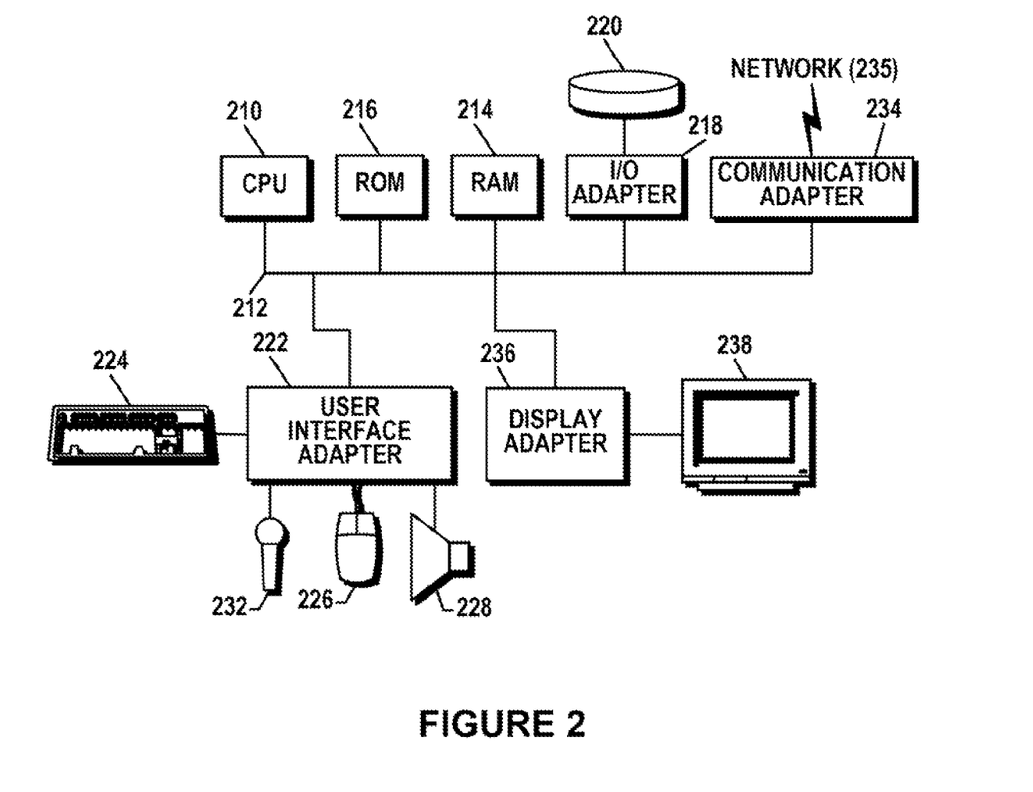
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
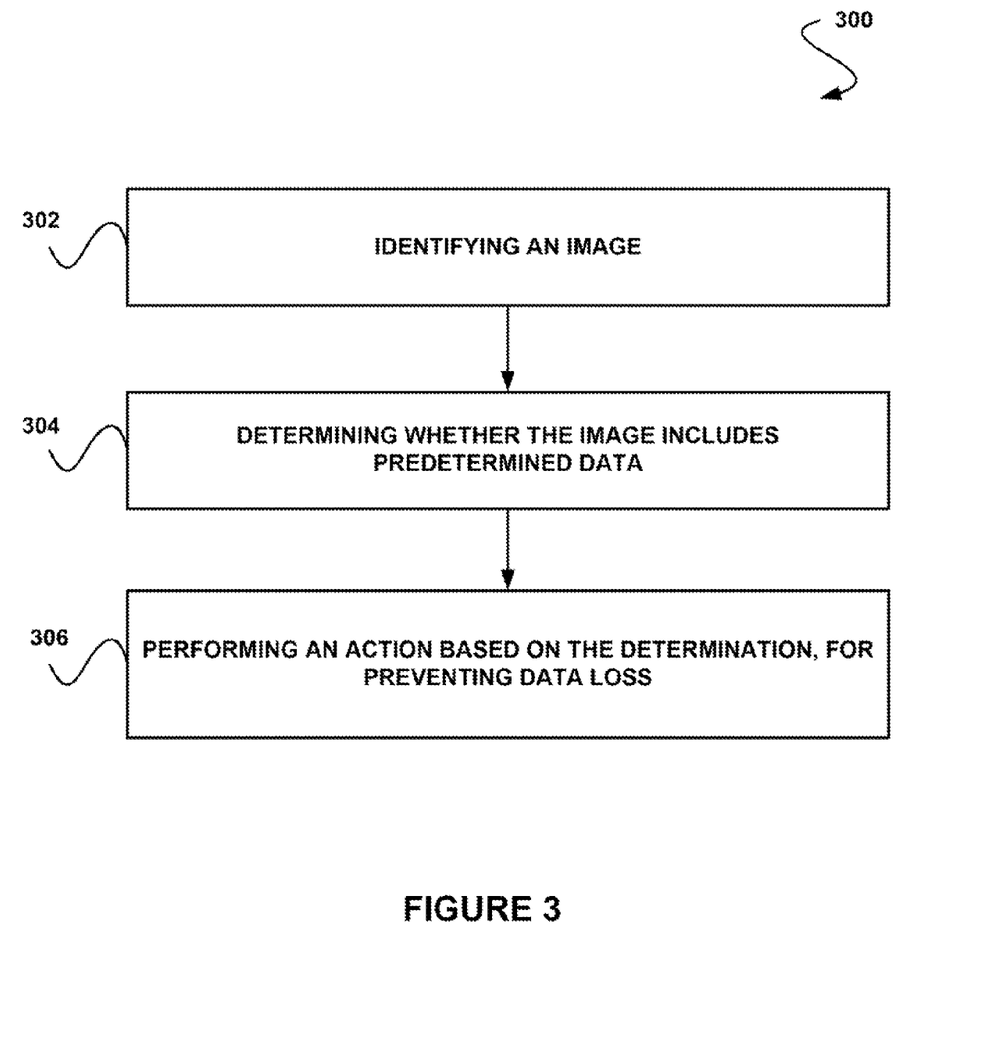
FIG. 3 shows a method for preventing data loss associated with an image, in accordance with one embodiment.

FIG. 3 shows a method 300 for preventing data loss associated with an image, in accordance with one embodiment. As an option, the method 300 may be carried out in the context of the architecture and environment of FIGS. 1 and/or 2. Of course, however, the method 300 may be carried out in any desired environment.

As shown in operation 302, an image is identified. In the context of the present description, the image may include any graphic or picture representation of data. In various embodiments, the image may include a JPEG interchange format (JPEG) image, a graphics interchange format (GIF) image, a tagged image file format (TIFF) image, a screenshot, and/or any other type of image that meets the above definition. In one embodiment, the image may be stored as a raster data set of binary or integer values that represent various data.

Additionally, in one embodiment, the image may be identified in response to communication of the image (or a request for such communication) over a network. For example, the image may be sent as an attachment to an electronic mail message over a network from a sender to a recipient. Just by way of example, the network may include any of the networks described above with respect to FIG. 1. Further, the image may be identified by analyzing, monitoring, etc. data communications over the network. Optionally, the image may be identified by analyzing outgoing electronic mail messages.

In another embodiment, the image may be stored on a device (e.g. such as any of the devices described above with respect to FIGS. 1 and/or 2). For example, the image may be stored on a hard disk drive of a personal computer. To this end, the image may optionally be identified during a system scan. Just by way of example, memory may be scanned for identifying the image (e.g. by identifying predetermined file formats, etc.).

As also shown, it is determined whether the image includes predetermined data. Note operation 304. The predetermined data may include any information, content, etc. that has been predetermined. In one embodiment, the predetermined data may include confidential data. In another embodiment, the predetermined data may include textual data. In still another embodiment, the predetermined data may include fingerprinted (e.g. hashed, etc.) data.

Additionally, it may be determined whether the image includes the predetermined data in any manner. For example, in one embodiment, the image may be analyzed. In another embodiment, data (e.g. textual data, etc.) may be extracted from the image. In still another embodiment, the textual data extracted from the image may be fingerprinted.

In yet another embodiment, it may be determined whether the image includes the predetermined data by comparing the image, or any portion of the image, against the predetermined data. For example, data extracted from the image, fingerprinted data associated with the image, etc. may be compared against the predetermined data. In another embodiment, the image may be determined to include the predetermined data, if the image, portion of the image, data extracted from the image, etc. matches the predetermined data or a portion thereof.

Furthermore, as shown in operation 306, an action is performed based on the determination, for preventing data loss. In the context of the present description, the data loss may refer to any loss of data. For example, the data loss may include data leakage, data deletion, a compromise of secure data, etc. In one embodiment, the data loss may result from communication of the image (e.g. over the network, etc.), presentation of the image to a user unauthorized to view the image, etc. Just by way of example, the data loss may be external and/or internal with respect to a network, organization, etc.

Additionally, the action may include any action capable of, at least in part, preventing data loss. For example, in one embodiment, communication of the image may be prevented. In this way, communication of the image may be prevented if it is determined that the image includes the predetermined data, as an option. Similarly, communication of the image may be allowed, if it is determined that the image does not include the predetermined data, as another option.

In yet another embodiment, the image may be quarantined (e.g. until manually deleted, allowed, etc. by a user). In still another embodiment, one or more of an administrator(s), a management team (e.g. a plurality of users, etc.), a sender of the image, and a recipient of the image may be notified. Additionally, a determination that the image includes the predetermined data may be logged. In this way, data loss involving images which include predetermined data may be prevented. Moreover, such data loss may optionally be prevented independently of a manner (e.g. device such as a camera, keyboard, mouse, application, etc.) in which the image is created (e.g. a manner in which a screenshot is captured, etc.).

Furthermore, prevention of the data loss may be accomplished utilizing any desired device. In various embodiments, the identification of the image, the determination of whether the image includes predetermined data, and the performance of the action may be performed at a gateway, a mail server, a web server, a file transfer protocol (FTP) server, a client device (e.g. desktop, laptop, etc.), and/or any other location, for that matter. Further, the different operations may or may not be performed at the same location.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
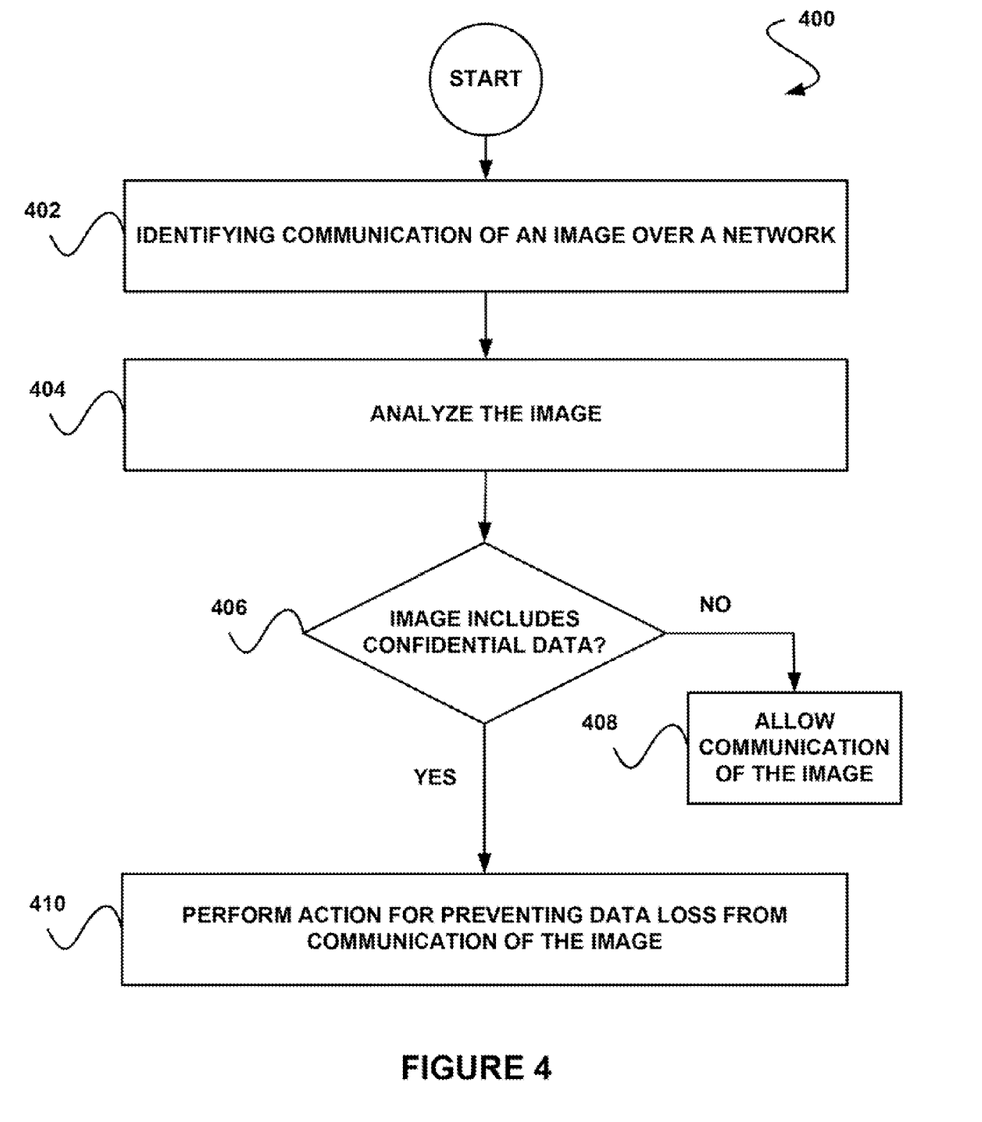
FIG. 4 shows a method for determining whether an image includes confidential data, in accordance with another embodiment.

FIG. 4 shows a method 400 for determining whether an image includes confidential data, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in operation 402, communication of an image over a network is identified. In one embodiment, the communication may include sending an electronic mail message containing the image from a sender to a recipient. In another embodiment, the communication may include uploading the image to one computer from another computer. In yet another embodiment, the communication may include downloading the image from one computer by another computer. However, the communication may include any transmission of the image over a network.

Furthermore, the communication of the image over the network may be identified in any manner. For example, the image may be identified by monitoring, flagging, tracking, etc. communications over the network. In one embodiment, the communication of the image may include a request for communication of the image over the network, such that identifying the communication may include identifying the request for such communication. As another option, the communication of the image may be identified by intercepting communication of the image over the network.

In addition, the image is analyzed. See operation 404. In one embodiment, the analysis may include extracting data (e.g. text, etc.) from the image. In another embodiment, the data extracted from the image may be fingerprinted. In yet another embodiment, the image may be flagged and examined by an administrator. However, the image may be analyzed in any manner.

Furthermore, in decision 406, it is determined whether the image includes confidential data. In the context of the present embodiment, the confidential data may include any data which is known to be confidential. Optionally, such data may be determined to be confidential if any predetermined words, phrases, etc. (or a number thereof meeting a predefined threshold) indicating a confidential nature of the data are identified. For example, the confidential data may include company policy information, trade secret information, information associated with a nondisclosure agreement, etc.

Optionally, the determination may be made automatically (e.g. via computer code, etc.). Additionally, in one embodiment, data extracted from the image may be compared to known confidential data for determining whether the image includes the confidential data. For example, all data extracted from the image may be fingerprinted and compared against a database of fingerprinted known confidential data. In another example, keywords selected from the data extracted from the image may be fingerprinted and compared against a database of fingerprinted keywords known to be indicative of confidential data. In another embodiment, an administrator may manually examine the image to determine if it includes the confidential data. Of course, the determination whether an image includes the confidential data may be made in any manner.

If it is determined in decision 406 that the image does not include confidential data, communication of the image is allowed. See operation 408. Additionally, any technique for allowing communication of the image may be performed. For example, in one embodiment, an electronic mail message containing the image may be sent to its intended recipient(s). In another embodiment, the image may be uploaded to a server in response to a request. In yet another embodiment, controls capable of being utilized (e.g. by a user, etc.) to send the image may be enabled.

If it is determined in decision 406 that the image includes confidential data, in operation 410, an action is performed for preventing data loss from the communication of the image. In one embodiment, such data loss may be prevented by preventing communication of the image over the network (e.g. denying a request to communicate the data, cancelling a communication of the data, etc.). Just by way of example, an electronic mail message may be prevented from being sent to its intended recipients. In another embodiment, an administrator or senior manager may be alerted or notified. However, any action for preventing data loss from communication of the image may be performed.

Figure 5:
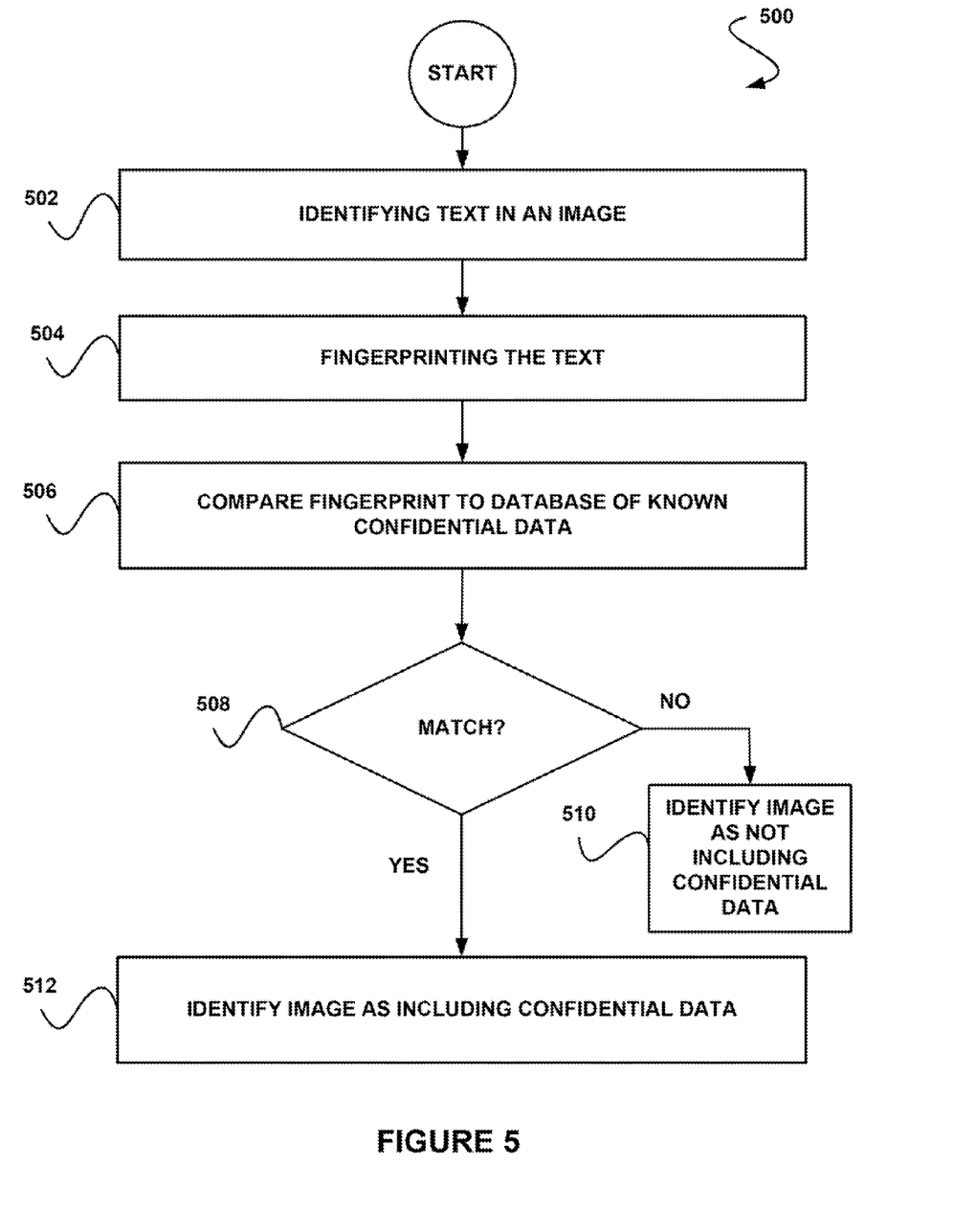
FIG. 5 shows a method for identifying an image as including confidential data, in accordance with yet another embodiment.

FIG. 5 shows a method 500 for identifying an image as including confidential data, in accordance with yet another embodiment. As an option, the method 500 may be carried out in the context of the architecture and environment of FIGS. 1-4. For example, the method 500 may be used in the context of operation 404 of FIG. 4, for example. Of course, however, the method 500 may be carried out in any desired environment. Again, it should also be noted that the aforementioned definitions may apply during the present description.

As shown in operation 502, text in an image is identified. In the context of the present description, the text may be numeric, symbolic, alphabetic, and/or any other type of text capable of being identified in an image. In one embodiment, the text in the image may be identified by performing an optical character recognition (OCR) procedure on the image. In another embodiment, the text in the image may be identified by performing an intelligent character recognition (ICR) procedure on the image. In yet another embodiment, the text in the image may be identified utilizing one or more neural networks (e.g. mathematical models, computational models, etc.). Of course, however, the text in the image may be identified in any manner.

Additionally, a fingerprint of the text is determined. Note operation 504. In the context of the present description, the fingerprint may be any value, string, etc. that identifies the text. For example, the fingerprint may be with respect to all or part of the text. To this end, the fingerprint may include a hash of the text, a hash of a portion of the text, etc.

In this way, the fingerprint of the text may be determined in any manner. For example, in one embodiment, the entire text may be hashed. In another embodiment, a portion of the text may be hashed.

Further, as shown in operation 506, the fingerprint is compared to a database of known confidential data. The database may include a list, an index, a string, a table, a relational database management system (RDBMS), and/or any other data structure which is capable of storing the known confidential data. Additionally, it should be noted that the database of known confidential data may store textual data, hashed data, modified data, and/or any other form of the known confidential data.

Moreover, the fingerprint may be compared with the database of known confidential data in any desired manner. For example, in one embodiment, the fingerprint may be compared with fingerprints stored in the database of known confidential data. In another embodiment, the database may include a hash table, such that the fingerprint may be utilized as an index for identifying known confidential data (or a fingerprint thereof) in the database to which the fingerprint is compared.

Further still, as shown in decision 508, it is determined if a match is found. In one embodiment, the match may be found, if the fingerprint exactly matches an entry in the database of known confidential data. In another embodiment, the match may be found, if the fingerprint approximately matches an entry in the database of known confidential data. In yet another embodiment, the match may be found, if a portion of the fingerprint matches a portion of an entry in the database of known confidential data. However, the match may be found in any manner.

If it is determined in decision 508 that no match is found, the image is identified as not including confidential data in operation 510. In one embodiment, the image may be tagged with an indication that it does not contain confidential data. In another embodiment, a null set may be returned. In still another embodiment, a user and/or administrator may be notified that the image does not contain confidential data. Of course, however, the image may be identified as not including confidential data in any manner.

If, in decision 508, it is determined that a match is found, the image is identified as including confidential data. Note operation 512. In one embodiment, the image may be tagged with an indication that it contains confidential data. In another embodiment, a notification may be generated for notifying the user and/or administrator that the image contains confidential data. Of course, however, the image may be identified as including confidential data in any manner.

Figure 6:
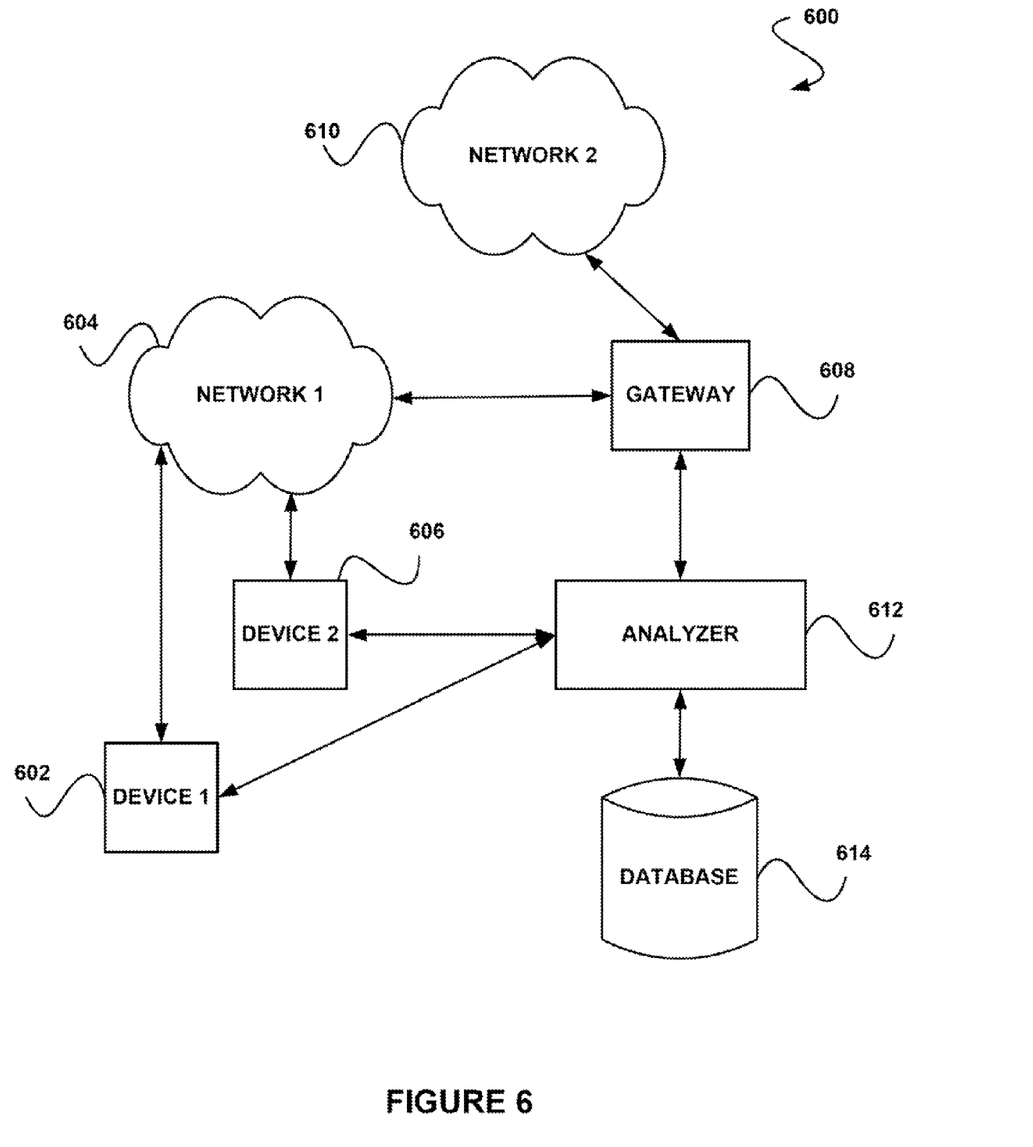
FIG. 6 shows a system for preventing data loss associated with an image, in accordance with one embodiment.

FIG. 6 shows a system 600 for preventing data loss associated with an image, in accordance with another embodiment. As an option, the system 600 may be implemented in the context of the architecture and environment of FIGS. 1-5. Of course, however, the system 600 may be implemented in any desired environment. Again, it should also be noted that the aforementioned definitions may apply during the present description.

As shown, a first device 602 is in communication with a second device 606 via an analyzer 612. While only two devices are shown, it should be noted that the first device 602 and/or second device 606 may also optionally be in communication with a plurality of other devices. In addition, the analyzer 612 may include a single analyzer, as shown, but, of course, may also include any combination of analyzers by which the first device 602 and the second device 606 communicate. In addition, the first device 602 is also in communication with the second device 606 via a first network 604.

As also shown, the analyzer 612 is in communication with a database 614. The database 614 may include any data structure capable of being utilized for storing data. Further, such data may include known confidential data, fingerprints of known confidential data, etc. Thus, the analyzer 612 may be capable of reading, retrieving, etc. data from the database 614. Optionally, the database 614 may receive data updates [e.g. from a server (not shown), etc.].

In one embodiment, the analyzer 612 may be utilized for identifying the communication of an image (e.g. over a network). For example, the analyzer 612 may be capable of identifying the communication of the image sent from the first device 602 to the second device 606. Such identification may be made by intercepting the communication, for example. While not shown, it should be noted that the analyzer 612 may be integrated with (e.g. installed on, etc.) the first device 602 and/or the second device 606.

In another embodiment, a gateway 608 may be utilized for identifying the communication of the image over the first network 604, as shown. Further, the gateway 608 may communicate the image (or a copy thereof) to the analyzer 612. It should be noted that while the analyzer 612 is shown as being separate from the gateway 608, the analyzer 612 may also be integrated with the gateway 608.

Additionally, in another embodiment, the analyzer 612 may analyze the image and determine whether the image includes confidential data. For example, the analyzer 612 may identify text in the image. Additionally, the analyzer 612 may fingerprint the text and compare the fingerprint of the text to fingerprints of known confidential data found in the database 614.

Further, in still another embodiment, the analyzer 612 may allow (e.g. forward, etc.) the communication of the image if the analyzer 612 determines that the image does not include confidential data. For example, the analyzer 612 may allow the first device 602 to communicate the image to the second device 606 if the analyzer 612 determines that the image does not contain any confidential data.

Furthermore, in still another embodiment, the analyzer 612 may perform an action for preventing data loss from the communication of the image if the analyzer 612 determines that the image includes confidential data. For example, if the analyzer 612 determines that the image sent from the first device 602 to the second device 606 includes confidential data, the analyzer 612 may block transmission of the image and send a message regarding the confidential nature of the image to the first device 602, the second device 606, an administrator, etc.

In yet another embodiment, the analyzer 612 may perform an on-demand or automated scan of the first device 602 and/or the second device 606 in order to determine if such devices 602, 606 store images which include confidential data. For example, the analyzer 612 may scan disk storage devices of the first device 602 and/or the second device 606 on a monthly basis in order to determine if the devices store images which include confidential data. Further, the analyzer 612 may perform one or more actions to prevent data loss if it is determined that any of such devices 602, 606 store images which include confidential data. Of course, such scan may also be carried out on external media such as a compact disc (CD), a digital versatile disc (DVD), a memory stick, a universal serial bus (USB) drive, etc.

As also shown, the first network 604 is in communication with a second network 610 via the gateway 608. While only two networks are shown, it should be noted that the first network 604 may also optionally be in communication with a plurality of other networks, and that the second network 610 may also optionally be in communication with a plurality of other networks.

In one embodiment, the gateway 608 may monitor network traffic between the first network 604 and the second network 610. To this end, the gateway 608 may be capable of identifying the communication of an image between such networks 604, 610. For example, the gateway 608 may identify the communication of an image from the first network 604 to the second network 610 or from the second network 610 to the first network 604.

In one embodiment, the gateway 608 may send the identified image to the analyzer 612 to determine whether the image contains confidential data. The analyzer 612 may also alert the gateway 608 of whether the image contains confidential data. Furthermore, the gateway 608 may allow communication of the image based on the alert received from the analyzer 612. For example, if the alert indicates that the image does not include confidential data, communication of the image may be allowed. However, if the alert indicates that the image includes confidential data, the gateway 608 may perform an action for preventing data loss from the communication of the image. For example, if the gateway 608 determines that an image sent from the first network 604 to the second network 610 includes confidential data, the gateway 608 may inform an administrator of one or both networks 604, 610 that communication of an image including confidential information was attempted, may block communication of the image, and/or may perform any other action to prevent data loss from the communication of the image.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. At least one non-transitory computer readable medium having instructions stored thereon, the instructions when executed on a machine cause the machine to:
    identify an image included within a communication;
    extract textual data from the image;
    determine whether the image includes predetermined data by comparing a representation of a portion of the textual data with the predetermined data, wherein the predetermined data includes data determined to be associated with confidential information, and wherein the image is determined to include the predetermined data if a number of predetermined keywords within the portion of the textual data matches a predefined threshold of predetermined keywords within the predetermined data known to be indicative of confidential data; and
    perform an action based on the determination, wherein the action includes preventing a subsequent communication of the image based on determining that the image includes the predetermined data; wherein the predefined threshold of predetermined keywords is equal to or greater than two.

2. The non-transitory computer readable medium of claim 1, wherein the action further includes quarantining the image based on determining that the image includes the predetermined data.

3. The non-transitory computer readable medium of claim 1, wherein extracting textual data from the image comprises performing an optical character recognition (OCR) procedure on the image.

4. The non-transitory computer readable medium of claim 1, wherein extracting textual data from the image comprises performing an intelligent character recognition (ICR) procedure on the image.

5. The non-transitory computer readable medium of claim 1, wherein the extracting of the textual data from the image is performed utilizing at least one neural network.

6. The non-transitory computer readable medium of claim 1, wherein preventing subsequent communication of the image includes preventing a subsequent electronic mail message, which attaches the image, from propagating in a network.

7. The non-transitory computer readable medium of claim 1, wherein the image is a screenshot.

8. The non-transitory computer readable medium of claim 1, wherein the image is identified in response to communication of the image over a network.

9. The non-transitory computer readable medium of claim 1, wherein the image is stored on a device.

10. The non-transitory computer readable medium of claim 1, wherein the image is identified during a system scan.

11. The non-transitory computer readable medium of claim 1, wherein the image is included as an attachment in an electronic mail message.

12. The non-transitory computer readable medium of claim 1, wherein the action further includes at least one of:
notifying an administrator;
notifying a management team;
notifying a sender of the image; and
notifying a recipient of the image.

13. The non-transitory computer readable medium of claim 1, wherein the representation of the portion of the textual data is generated by fingerprinting at least a portion of the textual data extracted from the image.

14. The non-transitory computer readable medium of claim 13, wherein fingerprinting the portion of the textual data includes hashing of the at least a portion of the textual data.

15. The non-transitory computer readable medium of claim 13, wherein the image is determined to include the predetermined data, if the fingerprinted textual data matches the predetermined data.

16. The non-transitory computer readable medium of claim 1, wherein the identifying, determining, and performing are performed at one or more of a gateway, a mail server, a web server, and a file transfer protocol server.

17. The non-transitory computer readable medium of claim 1, further comprising allowing communication of the image, if it is determined that the image does not include the predetermined data.

18. A computer-implemented method, comprising:
identifying an image included within a communication;
extracting textual data from the image;
determining whether the image includes predetermined data by comparing a representation of a portion of the textual data with the predetermined data, wherein the predetermined data includes data determined to be associated with confidential information, and wherein the image is determined to include the predetermined data if a number of predetermined keywords within the portion of the textual data matches a predefined threshold of predetermined keywords within the predetermined data known to be indicative of confidential data; and
performing an action based on the determination, wherein the action includes preventing a subsequent communication of the image based on determining that the image includes the predetermined data; wherein the predefined threshold of predetermined keywords is equal to or greater than two.

19. A system, comprising:
a processor, wherein the system is configured for:
identifying an image included within a communication;
extracting textual data from the image;
determining whether the image includes predetermined data by comparing a representation of a portion of the textual data with the predetermined data, wherein the predetermined data includes data determined to be associated with confidential information, and wherein the image is determined to include the predetermined data if a number of predetermined keywords within the portion of the textual data matches a predefined threshold of predetermined keywords within the predetermined data known to be indicative of confidential data; and
performing an action based on the determination, wherein the action includes preventing a subsequent communication of the image based on determining that the image includes the predetermined data; wherein the predefined threshold of predetermined keywords is equal to or greater than two.

20. The system of claim 16, further comprising memory coupled to the processor via a bus.

* * * * *